No. 669,082. Patented Mar. 5, 1901.
F. H. GRUENHAGEN.
DEVICE FOR REMOVING BICYCLE CRANKS.
(Application filed July 12, 1900.)

(No Model.)

Witnesses
Jos. H. Blackwood
L. H. Randolph Jr.

Inventor
Fred H. Gruenhagen
by D. A. Gourick
Attorney

THE NORRIS PETERS CO., PHOTO-LITHO., WASHINGTON, D. C.

UNITED STATES PATENT OFFICE.

FRED H. GRUENHAGEN, OF BRAINERD, MINNESOTA.

DEVICE FOR REMOVING BICYCLE-CRANKS.

SPECIFICATION forming part of Letters Patent No. 669,082, dated March 5, 1901.

Application filed July 12, 1900. Serial No. 23,403. (No model.)

*To all whom it may concern:*

Be it known that I, FRED H. GRUENHAGEN, a citizen of the United States, residing at Brainerd, in the county of Crow Wing and State of Minnesota, have invented certain new and useful Improvements in Devices for Removing Bicycle-Cranks from Shafts, of which the following is a specification.

My invention relates to a device for removing or disconnecting one or more parts of a bicycle and especially the pedal-cranks from the driving-shaft.

In order to make a bicycle as light as possible consistent with strength and to prevent the working loose, unnecessary wear, &c., of the parts thereof, the several parts are made to fit very tightly, and on this account it is difficult and sometimes impossible with the means heretofore used to remove or disconnect the pedal-cranks from the driving-shaft without injuring or destroying some of the parts, and especially the screw-threads on the shaft or hub.

The object of my invention is to overcome these difficulties by providing a device which is adapted to be applied to the pedal-crank of a bicycle or other vehicle, which will quickly and easily remove the cranks from the shaft without injuring any of the parts of the bicycle, and which is exceedingly simple and inexpensive in construction and easy to operate and capable of being adjusted to bicycles of different sizes.

My invention consists in the several features and combinations of features, as hereinafter more fully described and claimed.

Figure 1:
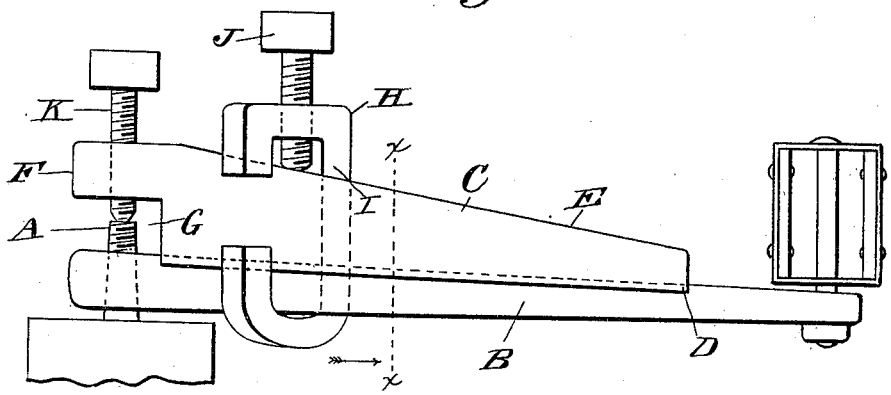
Figure 2:
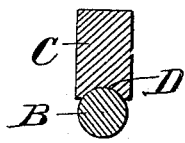
Figure 3:
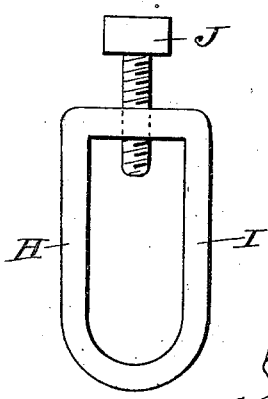
Figure 4:
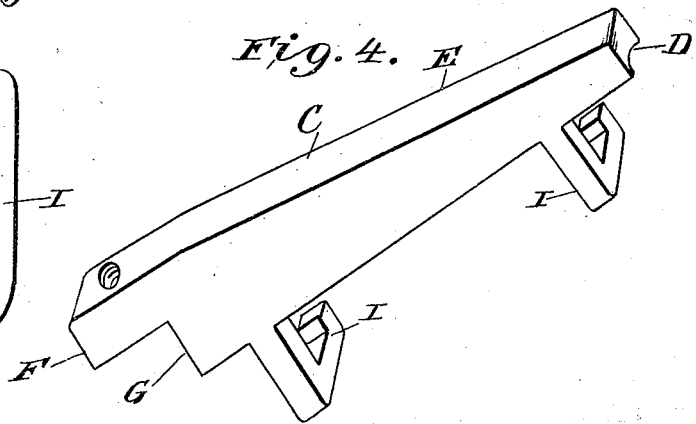

Referring to the drawings, Figure 1 is a top plan view of a bicycle pedal-crank and a portion of the driving-shaft with my invention applied thereto ready for use. Fig. 2 is a cross-section on line $x\ x$ of Fig. 1. Fig. 3 is a detail view of a modification of the clamp. Fig. 4 is a detail view of a modification of the clamping-bar.

In the drawings, in which like letters of reference indicate like parts throughout the several views, A represents the end of the driving-shaft of a bicycle or other vehicle, B a crank thereon, C a clamping bar or plate having its inner surface D grooved, its outer surface E inclined, and its inner end F having a recess G to provide a suitable space for the end of the shaft between the inner surface of the end of the clamping-bar and the crank. Said clamping-bar is adapted to have its grooved surface engage the side of the crank.

H is a clamp having a hook or link I, with a set-screw J at its upper end, said hook adapted to embrace and secure the clamping-bar to the crank.

K is a set-screw on the inner end of the clamping-bar, which is adapted to abut against the end of the shaft and be screwed inward, and thereby remove the crank therefrom.

In the modification shown in Fig. 3 the clamp is made in the shape of a loop or ring, and to apply it to a crank it has to be passed over the end of the crank and the pedal instead of being applied from the side of the crank, as is the case when the hook is used.

In Fig. 4 a modified form of clamping-bar is shown, in which the hooks instead of being separate are cast integral with said bar.

In using the device, assuming the several parts to be in the position shown in the drawings, it will be seen that the crank and the clamping bar or plate will be retained in their proper relative positions with respect to each other by the clamping-hook I of the clamp H. If the screw or bolt K be now rotated by a wrench or other suitable means, the action of the screw upon the end of the clamping-bar will tend to separate the driving-shaft and crank and said clamping-bar; but as the clamping-hook of the clamp holds the crank and clamping-bar together the force exerted by the end of the screw upon the end of the shaft will force the shaft in the direction of its rotation and the crank and clamping-plate in the opposite direction, so that by continuing the rotary motion of the screw the crank will be removed or disconnected.

The form of the clamping-hook or the form of the clamping-bar, as well as the manner of holding and adjusting them, may be changed somewhat and the device may be used in disconnecting crank-pins, &c., of the same or other parts of different or similar machines without departing from the spirit of my invention.

Having thus described my invention, what I claim is—

1. A device for disconnecting one part from another, consisting of a bar with a grooved inner surface, means for attaching said bar to the part to be disconnected, and means for disconnecting said part, substantially as shown and described.

2. A device for removing cranks from shafts comprising a clamping-bar, having its inner surface grooved, a clamp for securing said bar to the crank, and means for engaging the shaft, substantially as shown and described.

3. A device for removing cranks from shafts comprising a clamping-bar having its inner surface grooved, its outer surface inclined, and its inner end provided with a recess, and a clamp for securing said bar to a crank, substantially as shown and described.

4. A device for removing cranks from shafts comprising a clamping-bar, the inner surface of which is adapted to engage the surface of the crank, said clamping-bar having its end provided with a recess, means for engaging the shaft and a clamping-hook, substantially as shown and described.

5. A device for removing cranks from shafts comprising a clamping-bar with an inclined outer surface, a clamp for securing said bar to the crank, and means for engaging the shaft, substantially as shown and described.

6. A device for removing cranks from shafts comprising a clamping-bar having integral clamping-hooks, and means for engaging the shaft, substantially as shown and described.

7. A device for removing cranks from shafts, comprising a clamping-bar having an inclined outer surface, integral clamping-hooks, and means for engaging the shaft, substantially as shown and described.

8. A device for removing cranks from shafts, comprising a clamping-bar provided with a recess and a set-screw in the end thereof, said clamping-bar having a grooved inner surface and an inclined outer surface, and a clamp with a hook and set-screw for securing said clamping-bar to the shaft, substantially as shown and described.

In testimony whereof I hereto affix my signature in the presence of two witnesses.

FRED H. GRUENHAGEN.

Witnesses:
C. F. ANDERSON,
CARL MOHLEURE.